Jan. 16, 1940.    J. E. GILLESPIE    2,187,557
WHEEL AND TIRE MOUNT
Filed Feb. 14, 1939

Payson E. Gillespie.
INVENTOR
BY Victor J. Evans & Co.
ATTORNEYS

Patented Jan. 16, 1940

2,187,557

UNITED STATES PATENT OFFICE 2,187,557

WHEEL AND TIRE MOUNT

Jayson E. Gillespie, Lincoln, Nebr.

Application February 14, 1939, Serial No. 256,350

3 Claims. (Cl. 152—375)

My invention relates to automotive vehicles, and has among its objects and advantages the provision of an improved wheel particularly designed for coaction with a resilient tire. The wheel structure in the instant case is particularly designed for use in connection with a tire of the type disclosed in my prior Patent Number 2,137,670, issued November 22, 1938.

Figure 1:
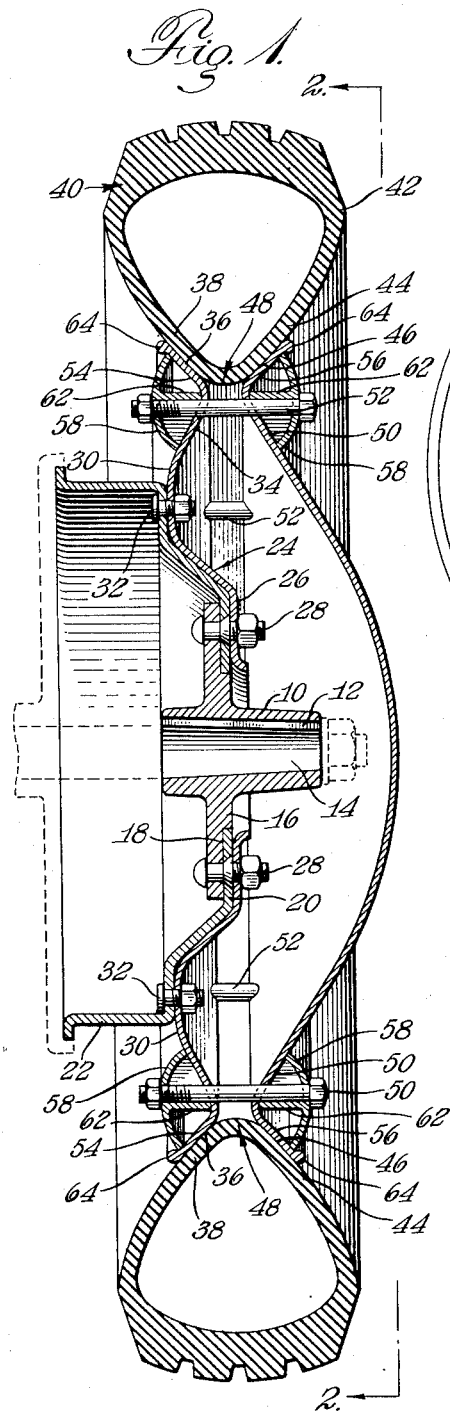
Figure 1 is a sectional view of a wheel embodying my invention.

In the embodiment selected to illustrate my invention, the wheel includes a hub part 10 keyed at 12 to the axle 14. Hub part 10 includes a flange 16 recessed at 18 for receiving the margin 20 of the brake drum 22. I provide a wheel disc 24 having a flange 26 lying adjacent the outer face of the flange 20, with the two flanges fixedly related into a unitary structure with the flange 16 through the medium of combination rivets and bolts 28.

Disc 24 includes a bellied area 30 connected at its apex with the drum 22 through the medium of bolts 32. Bellied area 30 terminates in inward and outward formations 34 and 36, respectively, which formations are so related as to take the configuration of a V. Formation 36 constitutes a rest for the side wall 38 of the vehicle tire 40 which has its inner cross sectional structure fashioned to take the configuration of a V. Tire 40 may be of the type disclosed in my above mentioned prior patent, which tire includes a casing 42 which may be provided with a resilient core in the manner disclosed in my above-mentioned patent.

The opposite wall 44 of the tire rests on a flange 46 opposite the formation 36 and related thereto so as to provide a trough 48 of V-shaped configuration in cross section. Flange 36 terminates in a wall 50 of dome-shaped configuration constituting a disc which provides a wall for the outer side of the wheel. The peripheral margin of the wall 50 is angularly related to the flange 46 so as to provide a V-shaped configuration such as that defined by the formations 34 and 36, but reversed thereto.

Figure 2:
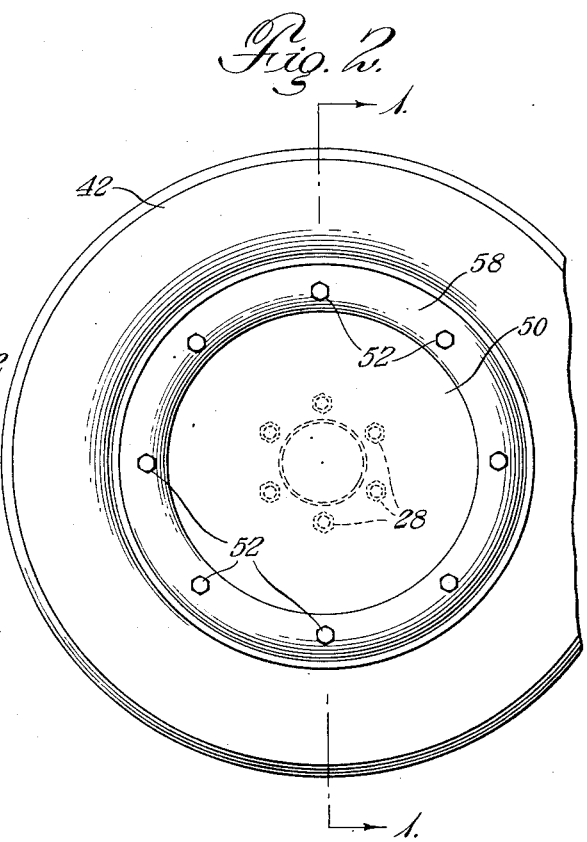
Figure 2 is a view taken from the position indicated by line 2—2 of Figure 1.
Figure 3:
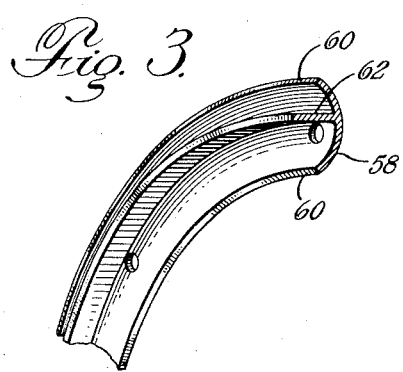
Figure 3 is a perspective view of a portion of one of the reinforcing rings.

Wall 50 is connected in predetermined spaced relation with the disc 24 through the medium of a plurality of bolts 52. Within each of the V's 54 and 56 I mount a reinforcing ring 58. Each ring is curved to bring its edges 60 into pressure relation with the two walls of its respective V 54 or 56, with the flange 62 of each ring arranged in pressure relation with the point of its respective V. Thus the rings 58 are pressed firmly into their respective V's through tightening of the bolts 52. Formation 36 and the flange 46 are each provided with a bead 64 arranged to constitute an abutment for one edge 60 of its respective ring 58. Figure 2 illustrates the flanges 62 of the rings 58 as being arranged in engagement with the bolts 52, and on the outer sides of the bolts with respect to the circumference defined thereby. Thus tightening of bolts 52 will urge the flanges 62 into pressure relation with the points of the V's 54 and 56, in addition to supporting the edges 60 in effective abutting relation with their respective beads 64, so as to secure effective reinforcement for the formation 36 and the flange 46 to resist forces transmitted thereto through the medium of the load bearing tire 40.

Tire 40 is easily associated with the wheel structure by merely removing the wall 50. The tire is effectively mounted through mere tightening of the bolts 52, and the wall 50 constitutes a side wall of the wheel structure for housing the axle and hub parts and the other structure associated therewith, so as to afford an element of ornamental appearance in addition to its utilitarian function.

Without further elaboration, the foregoing will so fully illustrate my invention that others may, by applying current knowledge readily adapt the same for use under various conditions of service.

I claim:

1. In an automotive vehicle wheel including a tire having angularly related walls, a wheel disc having a supporting flange arranged to engage one wall of the tire, a second disc having a flange arranged to engage the other angular wall of the tire, means for connecting the two discs into a unitary structure and for drawing the flanges thereof into pressure relation with the angular walls of the tire, said means including bellied rings positioned adjacent the discs, bolts connected with the rings for drawing the same into pressure relation with their respective discs, and reinforcing flanges between the rings and their respective discs.

2. In an automotive vehicle wheel including a tire having angularly related walls, a wheel disc having a supporting flange arranged to engage one wall of the tire, a second disc having a flange arranged to engage the other angular wall of the tire, means for connecting the two discs into a unitary structure and for drawing the flanges thereof into pressure relation with the angular walls of the tire, said means including bellied rings positioned adjacent the discs, bolts connected with the rings for drawing the same into pressure relation with their respective discs, the free edges of said flanges being formed to provide abutments engaging the outer peripheries of said rings, and reinforcing flanges between the rings and their respective discs.

3. In an automotive vehicle wheel including a tire having angularly related walls, a wheel disc having a supporting flange arranged to engage one wall of the tire, a second disc having a flange arranged to engage the other angular wall of the tire, means for connecting the two discs into a unitary structure and for drawing the flanges thereof into pressure relation with the angular walls of the tire, said means including bellied rings positioned adjacent the discs, bolts connected with the rings for drawing the same into pressure relation with their respective discs, the free edges of said flanges being formed to provide abutments engaging the outer peripheries of said rings, and reinforcing flanges between the rings and their respective discs, said reinforcing flanges lying adjacent said bolts, and the reinforcing rings being bellied outwardly of their respective discs, and the latter being bellied reversely of their respective rings throughout the corresponding ring-areas.

JAYSON E. GILLESPIE.